United States Patent Office 3,431,407
Patented Mar. 4, 1969

3,431,407
POLYNOMIAL ROOT FINDER
Kurt H. Haase, Watertown, Mass., assignor to the United States of America as represented by the Secretary of the Air Force
Filed Jan. 26, 1965, Ser. No. 428,275
U.S. Cl. 235—180           1 Claim
Int. Cl. G06g 7/34, 7/16, 7/36

ABSTRACT OF THE DISCLOSURE

A system for finding roots of a polynomial by determining coefficients of the polynomial in factored form. A pair of derived equations are solved by simultaneously substituting values into the derived equations and noting the values when both derived equations simultaneously equal zero.

---

This invention described herein may be manufactured and used by or for the U.S. Government for governmental purposes without payment to me of any royalty thereon.

This invention relates to electronic computers, and more particularly to a system for obtaining the roots of a polynomial.

The problem of polynomial root finding appears in many fields of physics and engineering such as the field of lump element network theory, aerodynamics, and the theory of servo mechanisms.

The subject of the invention is an automatic computer device, either of the digital or the analog type, designed to find the roots of a polynomial with real coefficients which may appear as real roots, or as pairs of real roots or as pairs of complex roots. There are no other types of roots if the polynomial under investigation has real coefficients.

A discrimination is made between polynomials of an odd order and polynomials of an even order. A polynomial of an odd order has at least one single real root which can be easily eliminated leaving as a residue an even order polynomial. This preliminary investigation is only necessary when the roots of an odd order polynomial have to be found and can also be performed by the invention. However, the main problem arises when the polynomial under investigation is of an even order or with the residue of a polynomial of an odd polynomial from which one real root is eliminated. This invention finds the root of an even order polynomial on an entirely new way using prior information of an even order polynomial which is based on the inventor's discovery of the system of $n+1$ equations that can be derived from a polynomial of the even order $n$. This system is published in the AFCRL Report 983, December 1961, On Two Matrix Systems Derived From a Polynomial of Even Order With Real Coefficients, by Kurt H. Haase. There is no limitation in the order of the polynomials to be investigated and it does not matter whether the roots to be found are real or conjugate complex. The prior knowledge is invariant for polynomials of the same order. The real coefficients of the polynomial are the only variants concerned with the particular problem.

It is therefore an object to provide a system for obtaining the roots of a polynomial.

It is another object to provide a system for obtaining the roots of a polynomial of an even order using an electronic computer.

These and other objects of the invention will become more apparent from the following description taken in connection with the illustrative embodiment in the accompanying drawings, wherein.

Figure 1:
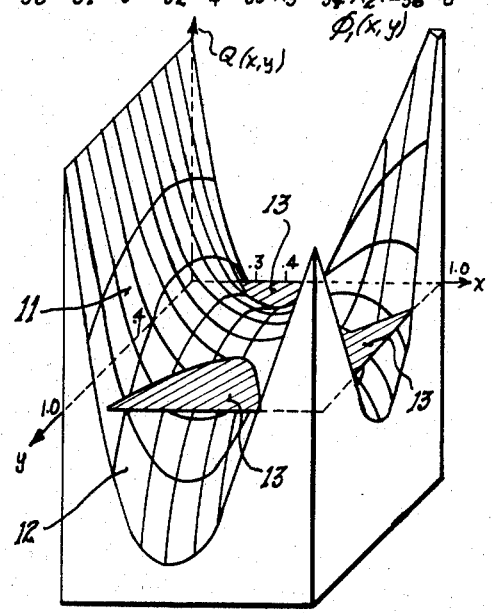
FIG. 1 shows a model of one equation of the system of $n+1$ equations derived from a polynomial showing mountains and beach curves.

A polynomial of an even order $n$ ($n$ is always assumed to be an even integer) and with real coefficients $A_0, \ldots, A_{n-1}$ is given in Eq. 1.

$$f(z) = z_n + A_{n-1}z^{n-1} + A_{n-2}z^{n-2} + \ldots + A_1z + A_0 \quad (1)$$

Eq. 1 will be referred to as the summation form of the polynomial $f(z)$. In this form the polynomial is known by the real coefficients which are real, positive or negative numerical values. When we identify $$f(z) = 0 \quad (2)$$

then, as well known, $f(z)$ has $n/2$ pairs of roots. Each pair consists of either two real roots, or of two conjugate complex roots. Both cases yield a factor $(z^2 + y_i z + x_i)$ and consequently has $f(z)$ the alternative product form given in Eq. 3.

$$f(z) = \prod_{i=1}^{n/2} (z^2 + y_i z + x_i) \quad (3)$$

As soon as we known the product form of $f(z)$, we also know the roots of the equation $f(z) = 0$ by solving the $n/2$ square equations:

$$z^2 + y_1 z + x_1 = 0$$
$$z^2 + y_2 z + x_2 = 0$$
$$\vdots$$

Assume now that a polynomial of an odd order $m$ has to be investigated. If $m$ is an odd integer, then $n = m - 1$ is the next lower even integer. The odd order polynomial is $$f_B(z) = z^m + B_{m-1}z^{m-1} + \ldots + B_1 z + B_0 = 0 \quad (4)$$

Eq. 4 has at least one real root which we call $-z_0$. Consequently has Eq. 4 the product form Eq. 5

$$f_B(z) = (z + z_0)(z^n + A_{n-1}z^{n-1} + \ldots + A_1 z + A_0) \quad (5)$$

The first factor in Eq. 5 can be found by replacing $z$ by a sequence of numerical values. When two subsequent values are substituted and the polarity in the substitution changes, the real root $-z_0$ is in between these values and can be located with any desired accuracy by a systematic approach. With the second factor in Eq. 5, the same procedure can be used as in investigating Eq. 1 and the main concern is with even order polynomials.

Since it is easier to use a special polynomial for illustration than more general algebraic language, the polynominal of the ORDER 6 has been chosen as an example which is:

$$f(z) = z^6 + A_5 z^5 + A_4 z^4 + A_3 z^3 + A_2 z^2 + A_1 z + A_0 \quad (6)$$

In accordance with Eq. 3, the polynominal in Eq. 6 has the alternative product form given in Eq. 7:

$$f(z) = (z^2 + y_1 z + x_1)(z^2 + y_2 z + x_2)(z^2 + y_3 z + x_3) \quad (7)$$

The problem is to find the real coefficients $y_1$, $y_2$, $y_3$, and $x_1$, $x_2$, $x_3$. It has been shown in the aforementioned report that for $y=y_1$, or $y_2$, or $y_3$ and for $x=x_1$, or $x_2$, or $x_3$ the following $6+1=7$ equations exist $$Z_{00}.1 + Z_{01}.A_5 + Z_{02}.A_4 + Z_{03}.A_3 \\ + Z_{04}.A_2 + Z_{05}.A_1 + Z_0.A_0 = 0 \quad (8a)$$

$$Z_{10}.1 + Z_{11}.A_5 + Z_{12}.A_4 + Z_{13}.A_3 \\ + Z_{14}.A_2 + Z_{15}.A_1 + Z_{16}.A_0 = \quad (8b)$$

.
.
.

$$Z_{50}.1 + Z_{51}.A_5 + Z_{52}.A_4 + Z_{53}.A_3 \\ + Z_{54}.A_2 + Z_{55}.A_1 + Z_{56}.A_0 = 0 \quad (8f)$$

$$Z_{60}.1 + Z_{61}.A_5 + Z_{62}.A_4 + Z_{63}.A_3 \\ + Z_{64}.A_2 + Z_{65}.A_1 + Z_{66}.A_0 = 0 \quad (8g)$$

In Eqs. $8a, \ldots, 8g$ the letter symbol $Z$ means a simultaneous polynomial in the real variables $y$ and $x$. The polynomials are discriminated by a two figure subindex, the first figure indicating the equation and the second the column. According to a table given in the aforementioned report, some of these values for a sixth order polynomial are given as:

$$Z_{00}=Z_{11}=Z_{22}=Z_{33}=Z_{44}=Z_{55}=Z_{66}=0 \quad (9a)$$

$$Z_{05}=Z_{50}=-x(x^2-3xy^2+y^4)\ Z_{06}=-Z_{60}= \\ y(3x^2-4xy^2+y^4)$$

and in general $$Z_{ik}=-Z_{ki}(-1)^{i+k} \quad (10)$$

If $f(z)$ is of any even order $n$ then, elements $Z_{00}, \ldots, Z_{0n}$ are obtained for the first equation, element $Z_{10}, \ldots, Z_{1n}$ for the second equation, finally elements $Z_{n0}, \ldots, Z_{nn}$ for the last equation of $n+1$ equations. The laws expresed in Eqs. $9a$ and $10$ are true for any even order. Elements with subindices with an odd figure sum are symmetric, elements with an even figure sum are skew symmetric and diagonal elements are zero. It is shown in the report that the elements $Z_{ik}$ are immediately known and these elements are tabulated in the report up to the polynomial ORDER 12.

Eqs. $8a, \ldots, 8g$ can be written shorter by the use of the matrix notation $$[Z_{ik}]_{6,6} \cdot [A_{6-k}] \quad (11)$$

In general, if $f(z)$ is a polynomial of the even ORDER $n$, then the $n+1$ equations $$[Z_{ik}]_{n,n} \cdot [A_{n-k}] = 0$$

$1, k=0, 1, \ldots, n$ are true. The elements $Z_{ik}$ are shown as are the real coefficients $A_0, A_1, \ldots, A_{n-1}$. The coefficient $A_n$ is always $=1$.

Figure 2:
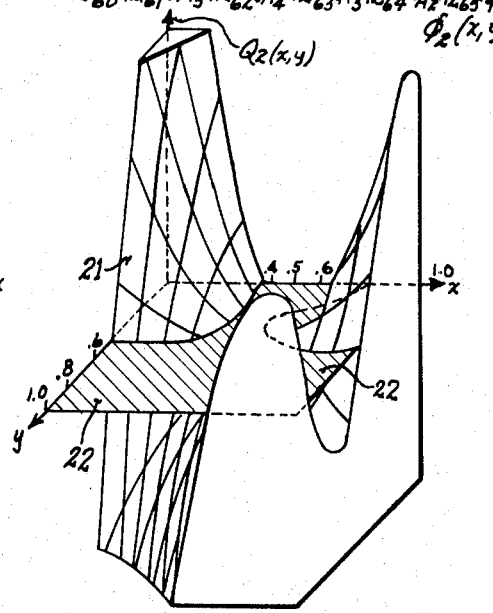
FIG. 2 shows a model of a second equation of the system of $n+1$ equations derived from a polynomial showing mountains and beach curves.
Figure 3:
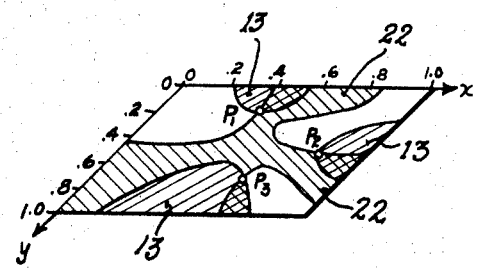
FIG. 3 shows the overlapping beach curves and their points of intersection taken from FIGS. 1 and 2.

There are three pairs of values $x$ and $y$ which satisfies any one of Eqs. $8a, \ldots, 8g$: a pair $x_1$ and $y_1$, a pair $x_2$ and $y_2$, and a pair $x_3$ and $y_3$. Subsituting any of these three pairs in any of these seven equations identifiies the left sides of Eqs. $8a, \ldots, 8g$ with zero. If there is substituted any other pair of real values of $x$ and $y$ which are different from the particular pairs of values, the left sides of Eqs. $8a, \ldots, 8g$ would not be identical with zero, but with some positive or negative real result. For instance for Eq. $8f$ within the range $0 \leq x \leq 1.0$ and $0 \leq y \leq 1.0$, take any point in the $x$-$y$ plane, substitute the pair of coordinates in Eq. $8f$ and compute the result. This is done in FIG. 1. The real positive or negative result is plotted above or below respectively the particular point in the $x$-$y$ plane. The result is a form in the shape of a mountain 11, rising from below the ocean at 12, cutting the ocean (zero level) in a beach curve 13 and then rising further above the sea level. Eq. $8g$ is shown in FIG. 2. Another mountain 21 is obtained which cuts the seal level in another beach curve 22. In FIG. 3 the beach curves 13 and 22 alone are shown. These curves intersect at the points $P_1$, $P_2$, and $P_3$ in the $x$-$y$ plane. The pairs of coordinates of $P_1$ $(x_1, y_1)$, of $P_2$ $(x_2, y_2)$ and of $P_3$ $(x_3, y_3)$ are the solutions of the original six-ORDER equation. These are the only pairs which identify the polynomials in Eq. $8f$ and Eq. $8g$ simultaneously. There are in infinite number of pairs of $x$ and $y$ along beach curve 13 to identify the polynomial in Eq. $8f$ with zero, or along the beach curve 21 to identify the polynomial in Eq. $8g$ with zero. But there are only three pairs, namely $x_1, y_1, x_2, y_2$ and $x_3, y_3$ which perform the identification simultaneously.

The method of root finding according to this new system can be outlined as follows:

Select a pair of derived equations. Compute the mountain by substituting real pairs $x$ and $y$. Find the beach curves. Finally find the intersections. This instruction offers more than is needed because it is not necessary to know how the mountain is shaped or even to know how the entire beach curves are shaped. Only the points of intersection are needed which means in our example of the ORDER 6, only the three pairs $x_1, y_1, x_2, y_2$ and $x_3, y_3$ must be found. The criterion of these pairs of coordinates is that both selected polynomials yield simultaneously the result of zero. When we investigate a polynomial of a higher order than 6, for instance a polynomial of the ORDER 8, then the result would be very similar. Instead of three we would get four intersecting beach curves with four intersecting points $P_{1, 2, 3, 4}$ corresponding to the solutions $x_1, y_1, \ldots x_4, y_4$.

Using the invention to find the roots of a polynomial of the ORDER 6, that is $$f(z) = z^6 + A_5 z^5 + A_4 z^4 + A_3 z^3 + A_2 z^2 + A_1 z + A_0$$

Assume that the three roots of this polynomial are the resultant of factorization $$f(z) = (z^2 + y_1 z + x_1)(z^2 + y_2 z + x_2)(z^2 + y_3 z + x_3)$$

The coefficients $y_1, y_2, y_3$ and $x_1, x_2, x_3$ are all between 0 and $+1.0$. This limitation is used only for an easier explanation of the invention.

Figure 4:
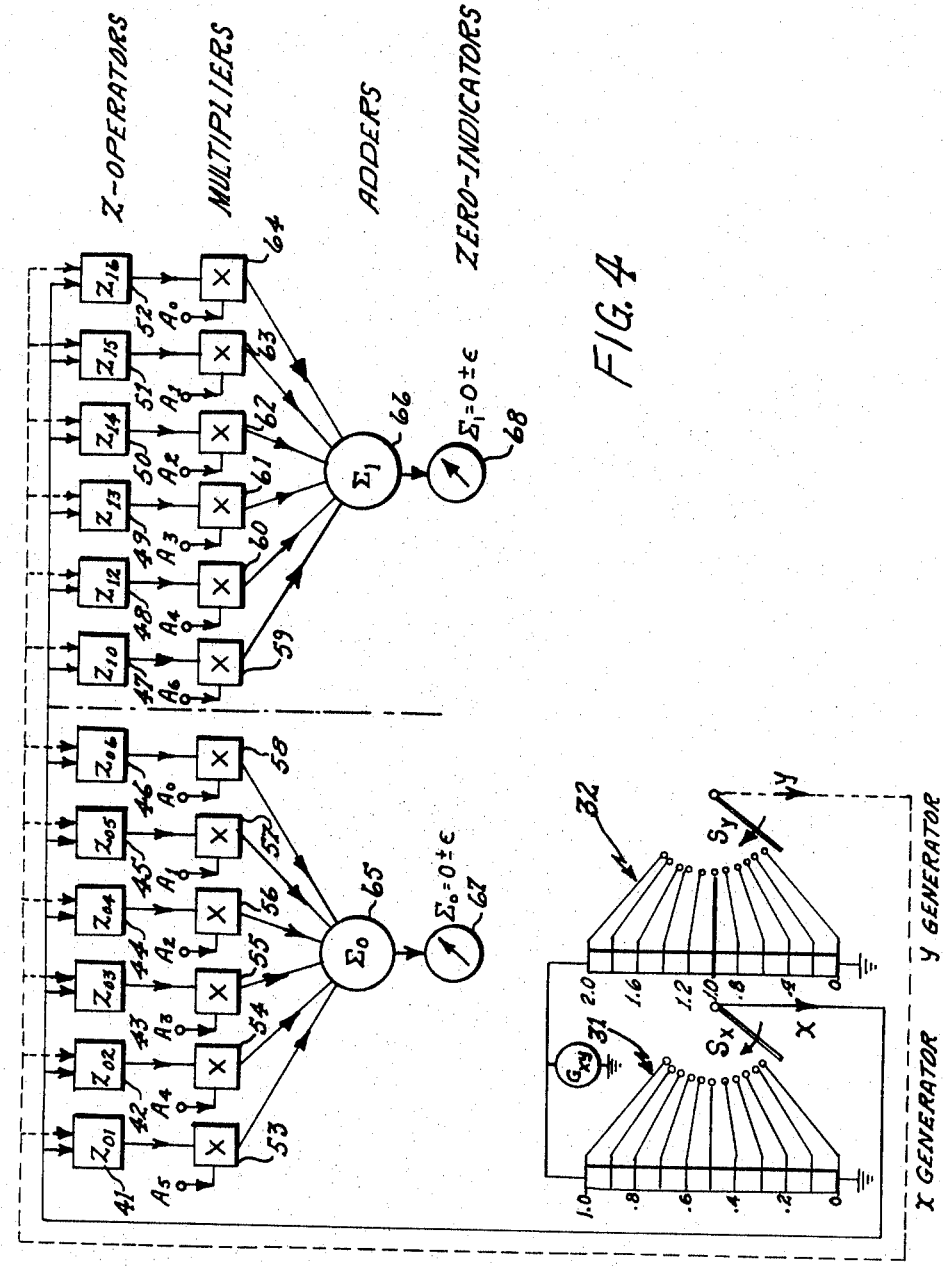
FIG. 4 shows a diagram partially in block form of an embodiment of the invention.

Referring to FIG. 4 there is shown $x$-generator 31 and $y$-generator 32 which are devices that generate signals either in the form of a D-C voltage value for an analog computer, or in the form of digits for a digital computer. Depending on the position of $x$-generator 31 and $y$-generator 32, values can be generated of $x=0.0, 0.1, \ldots 1.0$ and independently $y=0.0, 0.1, \ldots 1.0$ using the first half of the $y$-generator. There are two sets of Z-operators, 41–46 and 47–52. A Z-operator is a device that when fed by real values of $x$ and $y$ will produce an output which is a function of $x$ and $y$, for example $Z_{06}=y(3x^2-4xy^2+y^4)$. Devices such as these are well known in the analog and digital computer art. Examples for the analog method are discussed in chapter 6.13 of Electronic Analog Computers (1956), by Korn and Korn. They have nothing to do with the particular problem and only depend on the order of the polynomial under investigation. In the example shown in FIG. 4 Equation $8a$ is represented by Z-operators 41–46 and $8b$ is represented by Z-operators 47–52. The outputs of Z-operators 41–52 are linked to multipliers 53–64 respectively, which have a second input of values corresponding to the coefficients of the polynomial. The values $A_5, A_4, A_3, A_2, A_1$ and $A_0$ are fed to multipliers 53–58 and $A_6, A_4, A_3, A_2, A_1$ and $A_0$ are fed to multipliers 59–64. However, other values may be supplied to the multipliers which will be explained later. Multipliers 53–64 multiplies the output signals of Z-operators 41–52 with the A-coefficients. The outputs of multipliers 53–58 and multipliers 59–64 are added in adders 65 and 66, respectively, forming sums $\Sigma_0$ and $\Sigma_1$. The output of adders 65 and 66 have a shape of mountains shown in FIG. 1 and FIG. 2. Since we need only the results which are zero or nearly zero, adders 65 and 66 are followed by null indicators 67 and 68, respectively, which can be adjusted to a tolerance of $\pm \epsilon$.

In operation $x$-generator 31 is set on the first contact $x=0.0$ and $y$-generator 32 is rotated from 0.0 to 1.0. There are two values of $y$ in which indicator 67 will show $\Sigma_0 = 0 \pm \epsilon$ and two other values of $y$ in which indicator 68 will show $\Sigma_1 = 0 \pm \epsilon$, but this will not happen simultaneously. $x$-Generator 31 is then set on the next contact which is $x=0.1$ and $y$-generator 32 is again rotated from 0.0 to 1.0. This again may be the situation in which there are two values of $y$ for which indicator 67 indicates $\Sigma_0=0\pm\epsilon$ and two other values for which indicator 68 indicates $\Sigma_1=0\pm\epsilon$. According to FIG. 3 there will be three times that for a certain position of $x$-generator 31, there is one position of $y$-generator 32 where simultaneously the indication $\Sigma_0$ and the indication $\Sigma_1$ is zero, or within the tolerance $\pm\epsilon$. In this case the center indicator will give a zero signal and thus select the pairs $x_1$, $y_1$, $x_2$, $y_2$ and $x_3$, $y_3$.

It has been a rigorous limitation in the preceding section to assume that the beach crossings are within the quadrant $0=x=1$ and $0=y=1$ but the use of the invention is expanded by using the following well known results of the theory of functions:

(1) If $f(z)$ contains the factor $z^2-pz+q$, then $f(-z)$ contains the factor $z^2+pz+q$,
(2) If $f(z)$ contains the factor $z^2+pz+q$ and $q>1$, then $f(1/z)$ contains the factor $z^2+zp/q+1/q$ where $1/q<1$.

Figure 5:
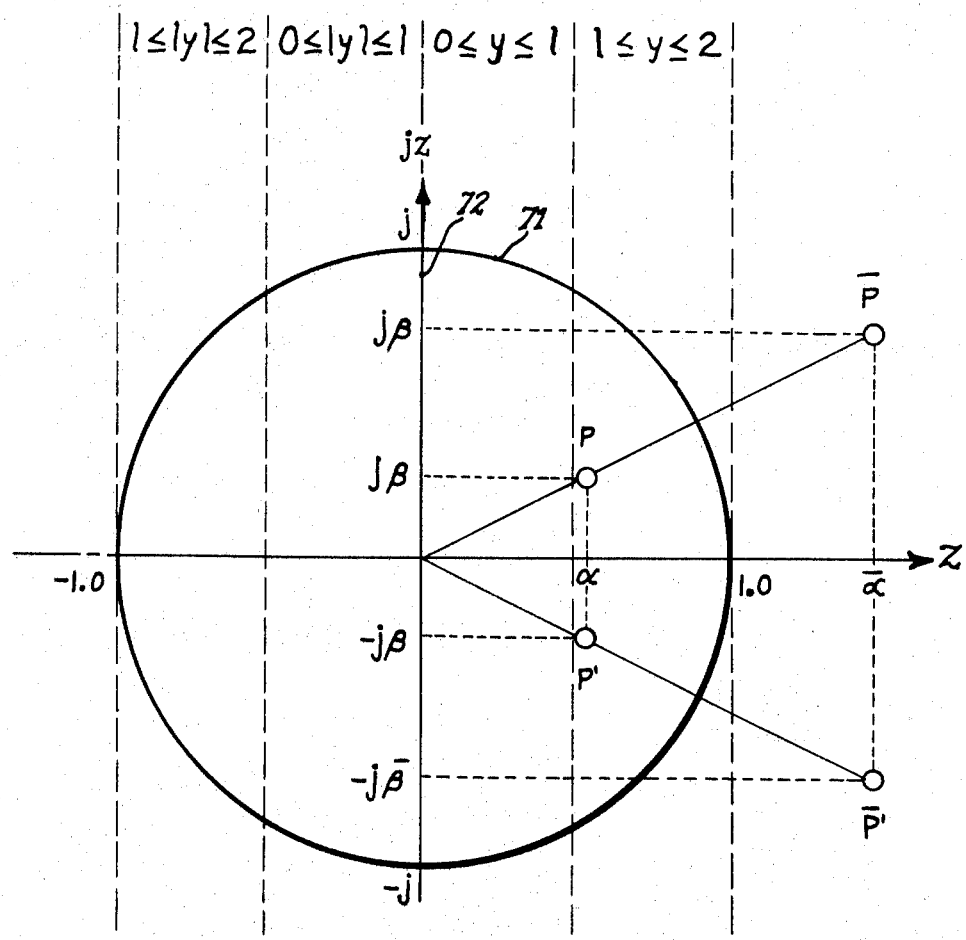
FIG. 5 shows a unit circle for explanation of the invention when the values of $x$ and $y$ are greater than one or negative.

Referring to FIG. 5, if the even order polynomial contains only conjugate complex roots, the roots $\alpha_i\pm j\beta_i$ are then either inside unit circle 71 or outside. If the roots are inside, then $x_i\leq 1$ and $y_i\leq 2.0$. If the roots are right of imaginary axis 72, then $p$ is negative, but $p\leq 2$. If the roots are left of imaginary axis 72, then $p$ is positive, but $p\leq 2$. The coefficient $q=\alpha^2+\beta^2$ is always positive and less than 1 if the zeros are conjugate complex and inside unit circle 71. Thus, to find conjugate complex roots inside unit circle 71, the variable $x_i$ has to cover the range $0\leq x_i\leq 1.0$ only but the variable $y_i$ has to cover the range $0\leq y_i\leq 2.0$. As is shown above, $y_i$ or $p$ may be negative. It would be unpractical to demand that $y_i$ covers the range $-2.0 \ldots 0 \ldots +2.0$. Instead, if $y_i$ is negative, the polynomial $f(-z)$ is investigated in which $-y_i$ is positive.

Hence the $x$-generator 31 generates signals $0\leq x\leq 1.0$ and $y$-generator 32 generates signals $0\leq y\leq 2.0$. Now the entire range of $y$-generator 32 is used or, as an alternative, the generator shown in my issued Patent No. 3,358,151 could be used. To find the components $x_i$ and $y_i$ resulting from roots inside unit circle 71, the coefficients $A_0$, $A_1$, $A_2$, $A_3$, $A_4$, $A_5$, and $A_6=1$ are placed into multipliers 53–64 in FIG. 4 and the components inside unit circle 71 and left to imaginary axis 72 are obtained. The coefficients $A_0$, $-A_1$, $A_2$, $-A_3$, $A_4$, $-A_5$, and $A_6=1$ which are the coefficients of the polynomial $f(-z)$ are placed into multipliers 53–64 and the components inside unit circle 71 and right of imaginary axis 72 are obtained.

If the roots are outside of unit circle 71 then in the factor $z^2+pz+q$, the component $q$ would be greater than 1.0, but still positive. But the polynomial $f(1/z)$ in this case would involve the factor $$z^2+z\frac{p}{q}+1/q$$

The component $1/q$ is smaller than 1.0 and the component $p/q$ is smaller than 2.0 and the range of the computer with $x$ covering $0 \ldots 1.0$ and $y$ covering $0 \ldots 2.0$ is again sufficient. Hence the components are found resulting from roots inside unit circle 71 by placing the coefficients $A_0$, $\pm A_1$, $A_2$, $\pm A_3$, $A_4$, $\pm A_5$, and $A_6=1$ into the multipliers 53–64. The roots outside unit circle 71 are found by placing the coefficients in the inverse sequence $A_6=1$, $\pm A_5$, $A_4$, $\pm A_3$, $A_2$, $\pm A_1$, and $A_0$ into the multipliers 53–64. That is done because if $$f(z)=z^6+A_5z^5+A_4z^4+A_3z^3+A_2z^2+A_1z+A_0$$

then $$f(1/z)=A_0z^6+A_1z^5+A_2z^4+A_3z^3+A_4z^2+A_5z+1$$

To summarize the technique in solving a polynomial, the following procedure would be used: in a first run, with the coefficients $A_6$, $A_5$, $\ldots$, $A_0$ inserted in the multipliers, the real roots left of the imaginary axis are determined. Then, in a second run, the coefficients $A_6$, $-A_5$, $A_4$, $-A_3$, $\ldots$, are inserted in the multipliers and the roots right of the imaginary axis are determined. In the first and second runs only, the roots smaller than 1.0 are determined. In the two following runs the real roots are determined which have magnitudes greater than 1.0. In the third run, the coefficients are placed in the multipliers in the inverse sequence, i.e., $A_0$, $A_1$, $\ldots$, $A_6$, and the roots left of the imaginary axis are determined. In the fourth run, the coefficients $A_0$, $-A_1$, $A_2$, $-A_3$, $\ldots$ are inserted in the multipliers and the roots right of the imaginary axis are determined.

The solving of the real roots is not limited to even-order polynomials. In the same way, we can solve the real roots of an odd order polynomial, and it is known that an odd order polynomial contains at least one real root. The computer has to be provided only with the necessary number of Z-operators.

What is claimed is:
1. A computing apparatus for finding the roots of a polynomial $f(z)$ by determining the coefficients $x_i$ and $y_i$ of the factored form of the polynomial

$$\prod_{i=1}^{n/2} (z^2+y_iz+x_i)$$

where the values of $z$ are the roots of the polynomial, comprising:

(a) means for generating a first and second set of analog signals, $x_i$ and $y_i$, corresponding to coefficients of the polynomial in factored form, the generating means producing a series of simultaneous analog outputs consisting of one signal from the first set and one signal from the second set;

(b) means for converting the outputs of the generating means to two analog sets of predetermined functions of $x_i$ and $y_i$;

(c) means for multiplying the two sets of functions by coefficients of the original polynomial form forming two sets of products;

(d) means for adding the two sets of products to form a pair of sums;

(e) and a pair of indicators one each fed by each of the adding means for showing a minimum output value of the pair of sums, the simultaneous minimums of both sums being indicative of solutions of the factored form of the polynomial.

References Cited

UNITED STATES PATENTS

| | | | |
|---|---|---|---|
| 2,626,103 | 1/1953 | Serrell et al. | 235—180 |
| 2,900,136 | 8/1959 | Tuttle et al. | 235—180 |
| 2,915,246 | 12/1959 | Piety | 235—180 |

MALCOLM A. MORRISON, *Primary Examiner.*

FELIX D. GRUBER, *Assistant Examiner.*

U.S. Cl. X.R.

235—194, 197